United States Patent
DeLaRosa et al.

(10) Patent No.: US 8,707,575 B2
(45) Date of Patent: *Apr. 29, 2014

(54) TAPE MEASURING DEVICE WITH MAGNETIC END HOOK

(71) Applicants: Dan DeLaRosa, Coral Springs, FL (US); Glenn Robinson, Parkland, FL (US)

(72) Inventors: Dan DeLaRosa, Coral Springs, FL (US); Glenn Robinson, Parkland, FL (US)

(73) Assignee: IBT Holdings, LLC, Deerfield Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,974

(22) Filed: Jan. 23, 2013

(65) Prior Publication Data

US 2013/0263463 A1    Oct. 10, 2013

Related U.S. Application Data

(63) Continuation of application No. 12/927,955, filed on Dec. 1, 2010, now Pat. No. 8,381,411.

(51) Int. Cl.
*G01B 3/10* (2006.01)

(52) U.S. Cl.
USPC .................. 33/770; 33/758; 33/768

(58) Field of Classification Search
USPC ............... 33/755, 758, 760, 768, 770, DIG. 1
See application file for complete search history.

(56) References Cited

U.S. PATENT DOCUMENTS

| | | | | |
|---|---|---|---|---|
| 3,036,791 | A * | 5/1962 | Siggelkow | 33/758 |
| 4,924,597 | A * | 5/1990 | Tursi | 33/758 |
| 6,511,112 | B2 * | 1/2003 | Schroeder | 33/770 |
| 6,546,644 | B2 * | 4/2003 | Poineau et al. | 33/758 |
| 6,663,153 | B2 * | 12/2003 | Brunson | 33/770 |
| 6,678,967 | B1 * | 1/2004 | Jueneman | 33/758 |
| 6,874,245 | B2 * | 4/2005 | Liu | 33/758 |
| 7,124,515 | B2 * | 10/2006 | Juenemann | 33/758 |
| 7,240,439 | B2 * | 7/2007 | Critelli et al. | 33/758 |
| 7,475,492 | B1 * | 1/2009 | Huang | 33/758 |
| 7,555,845 | B2 * | 7/2009 | Critelli et al. | 33/767 |
| 7,669,347 | B1 * | 3/2010 | Huang | 33/758 |
| 7,805,855 | B2 * | 10/2010 | Seo | 33/758 |
| 2002/0184783 | A1 * | 12/2002 | Poineau et al. | 33/758 |
| 2003/0167651 | A1 * | 9/2003 | Pedersen | 33/758 |
| 2006/0283036 | A1 * | 12/2006 | Huang | 33/758 |
| 2007/0074418 | A1 * | 4/2007 | Critelli et al. | 33/758 |
| 2008/0034604 | A1 * | 2/2008 | Critelli et al. | 33/767 |
| 2009/0031576 | A1 * | 2/2009 | Huang | 33/758 |
| 2009/0288307 | A1 * | 11/2009 | Zhou | 33/758 |
| 2010/0050456 | A1 * | 3/2010 | Huang | 33/770 |
| 2010/0175273 | A1 * | 7/2010 | Seo | 33/770 |
| 2012/0073156 | A1 * | 3/2012 | DeLaRosa et al. | 33/770 |
| 2012/0159799 | A1 * | 6/2012 | Murray et al. | 33/770 |
| 2013/0263463 | A1 * | 10/2013 | DeLaRosa et al. | 33/770 |

* cited by examiner

*Primary Examiner* — Yaritza Guadalupe-McCall
(74) *Attorney, Agent, or Firm* — Dan DeLaRosa

(57) ABSTRACT

A magnetic end hook for a tape measuring device is provided, the end hook comprising vertical and horizontal elements, the horizontal element of the end hook is generally perpendicular to the vertical element of the end hook, the vertical element comprising a cavity designed for receiving a magnet; and at least one magnet situated within said cavity.

20 Claims, 14 Drawing Sheets

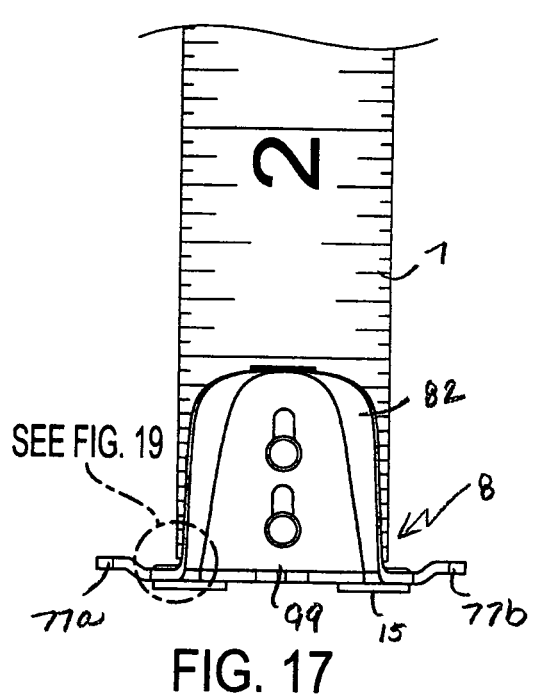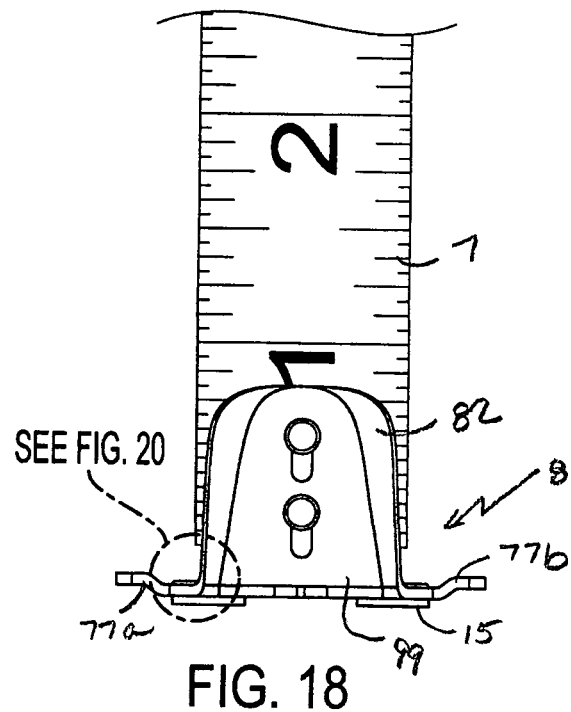
FIG. 17    FIG. 18
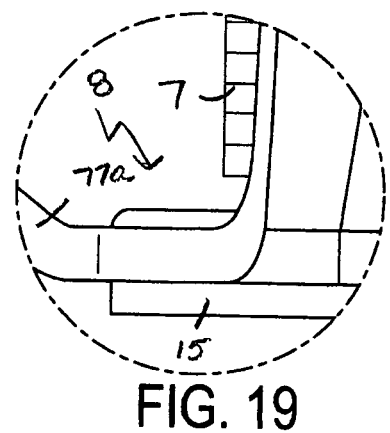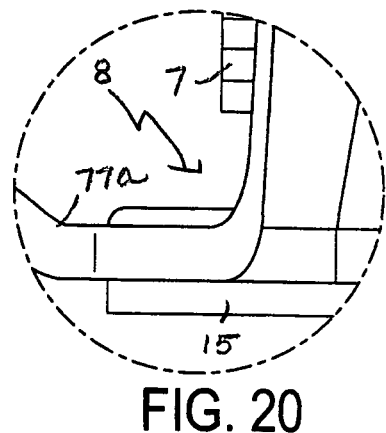
FIG. 19    FIG. 20

TAPE MEASURING DEVICE WITH MAGNETIC END HOOK

RELATED APPLICATIONS

This application is a continuation of U.S. application Ser. No. 12/927,955 which was filed on Dec. 1, 2010 entitled "Tape Measuring Device with Magnetic End Hook", which is a continuation-in-part of U.S. application Ser. No. 12/924,310 which was filed on Sep. 24, 2010 entitled "Tape Measuring Device with Magnets".

BACKGROUND OF THE INVENTION

1. Field of the Invention

This invention relates to a tape measuring device having at least one magnet or a plurality of magnets strategically placed throughout its housing so that the tape measuring device may be attached to a metallic surface such as metallic tool boxes and cases, metallic working surface, other metallic tools, etc. The present invention also provides for an end hook of the tape blade of a tape measuring device which has at least one magnet or a plurality of magnets attached thereto; and has an offset system to provide for accurate measurements.

2. Description of the Related Art

There are various patents covering tape measuring devices with mechanisms such as clips and straps and other device that allows a tape measuring device to be attached to a working surface or a tool box or other desired areas.

SUMMARY OF THE INVENTION

In one embodiment, the present invention provides for a tape measuring device comprising: a housing comprising a hollow interior cavity and an opening, the opening leads to the hollow interior cavity, and the housing has at least two side walls, and top and bottom portions, the side walls with the top and bottom portions forms exterior surfaces of the housing; an extendable and retractable tape blade having opposing ends, and the tape blade is scrollably received within the hollow interior cavity of the housing, at least one end of the tape blade is designed to protrude from the opening of the housing and is attached to an end hook, and the end hook comprises at least one cavity; and a first magnet designed to fit within the cavity of the end hook, at least a portion of the magnet protrudes from the end hook.

In another embodiment, the end hook has a front portion, and the cavity is situated on the front portion of the housing. In yet another embodiment, the device further comprises a second magnet attached to the housing of the tape measuring device.

In still another embodiment, the second magnet is attached to at least one of the side walls of the housing. In still yet another embodiment, the device further comprises a cover plate designed to fit over at least a portion of the second magnet. In another further embodiment, at least a portion of the second magnet is exposed from the cover plate. In yet another further embodiment, the magnet is a ring shaped magnet.

In yet a further embodiment, the second magnet is attached to the top portion of the housing of the tape measuring device. In still a further embodiment, the device further comprises a top portion cover designed to fit over at least a portion of the second magnet. In still yet a further embodiment, at least a portion of the second magnet protrudes from the top portion cover.

In another embodiment, the second magnet is attached to at least a portion of the bottom portion of the housing. In yet another embodiment, the bottom portion of the housing comprises at least one foot. In still another embodiment, the foot of the bottom portion of the housing comprises at least one foot cavity, and at least a portion of the second magnet is designed to fit within the foot cavity of the bottom portion of the housing. In still yet another embodiment, at least a portion of the second magnet protrudes from the foot cavity of the bottom portion of the housing. In a further embodiment, the device further comprises a bottom portion cover designed to fit over at least a portion of the second magnet and at least a portion of the bottom portion of the housing.

In another further embodiment, the present invention relates to a tape measuring device comprising: a housing comprising a hollow interior cavity and an opening, the opening leading to the hollow interior cavity, and the housing has at least two side walls, and top and bottom portions, the side walls with the top and bottom portions form exterior surfaces of the housing; an extendable and retractable tape blade having opposing ends, the tape blade is scrollably received within the hollow interior cavity of the housing, at least one end of the tape blade is designed to protrude from the opening of the housing and is attached to an end hook; a first magnet designed to be attached to at least a portion of one of the side walls of the housing; and at least one cover plate designed to fit over at least a portion of the side wall and at least a portion of the first magnet.

In another embodiment, the device further comprises a second magnet attached to the top portion of the housing. In yet another embodiment, the device further comprises a top portion cover designed to fit over at least a portion of the second magnet.

In still another embodiment, the device further comprises a second magnet attached to said bottom portion of said housing. In still yet another embodiment, the device further comprises a bottom portion cover designed to fit over at least a portion of the second magnet.

In a further embodiment, the present invention provides for a tape measuring device comprising: a housing comprising a hollow interior cavity and an opening, the opening leading to the hollow interior cavity, and the housing has at least two side walls, and top and bottom portions, and the side walls with the top and bottom portions form the exterior surfaces of the housing; an extendable and retractable tape blade having opposing ends, the tape blade is scrollably received within the hollow interior cavity of the housing, at least one end of the tape blade is designed to protrude from the opening of the housing and is attached to an end hook; a first magnet attached to the top portion of the housing; and a second magnet attached to the bottom portion of the housing.

In another embodiment, the present invention provides for a tape measuring device comprising: a housing comprising a hollow interior cavity and an opening, the opening leading to the hollow interior cavity; an extendable and retractable tape blade having opposing ends, the tape blade is scrollably received within the hollow interior cavity of the housing, at least one end of the tape blade is designed to protrude from the opening of the housing; an end hook having opposing front and rear portions, at least one end of the tape blade being attached to the rear portion of the end hook, and the rear portion of the end hook is generally perpendicular to the front portion of the end hook, the front portion of the end hook has a frontal surface and at least one cavity, the cavity forming a protrusion on a rear surface of the front portion of the end hook; and a first magnet designed to fit within the cavity of the end hook.

In yet another embodiment, the front portion of the end hook comprising at least one side arm. In still another embodiment, the side arm of the front portion of the end hook is offset and is generally parallel to the protrusion of the cavity on the rear surface of the front portion of the end hook to thereby allow for accurate measurements when the rear surface of the front portion contacts an object to be measured. In still yet another embodiment, the side arm of the front portion is set backward of the front portion of the end hook to a distance that is parallel to the protrusion of the cavity to thereby allow for accurate measurements.

In a further embodiment, the front portion of the end hook comprises a second cavity, and the second cavity forms a second protrusion on the rear surface of the front portion of the end hook. In yet a further embodiment, the device further comprises a second magnet, and the second magnet is designed to fit with the second cavity of the front portion of the end hook.

In still a further embodiment, the front portion of the end hook comprises a second side arm situated opposing the first side arm. In still yet a further embodiment, the first and second side arms are offset backward to be generally parallel to the first and second protrusion on the rear surface of the front portion of the end hook to thereby allow for accurate measurements.

In another embodiment, the device further comprises a crown attached to the end hook.

In yet another embodiment, the magnet is glued to the cavity of the front portion of said end hook. In still another embodiment, the first and second magnets are adhered to the first and second cavities of the front portion of the end hook using adhesives, glues, laminates, thermoplastics, elastomers, thermosets, epoxies, curing adhesives and mixtures thereof. In still yet another embodiment, the crown is attached to a portion of the rear portion of the end hook. In a further embodiment, the crown is movable relative to the rear portion of the end hook. The movement of the crown relative to the end hook also provides for accuracy of measurements.

In another further embodiment, the crown comprises a frontal element, the frontal element of the crown is generally perpendicular to the rear portion of the end hook and is generally parallel to the front portion of the end hook.

In still another further embodiment, at least a portion of the first and second magnets protrude from the frontal surface of the front portion of the end hook.

In still yet another further embodiment, the present invention provides for a tape measuring device comprising: a housing; an extendable and retractable tape blade having opposing ends, one end of the tape blade is attached to and situated within the housing; an end hook having opposing front and rear portions, the second end of the tape blade is attached to the end hook, and the rear portion of the end hook is generally perpendicular to the front portion of the end hook, and the front portion of the end hook has a frontal surface and at least one cavity, the cavity forms a protrusion on a rear surface of the front portion of the end hook, the front portion of the end hook comprising at least two opposing side arms, and the side arms are offset so that the side arms are generally parallel to the protrusion on the rear surface of the front portion of the end hook to thereby allow for accurate measurements; and at least one magnet glued within the cavity of the end hook, at least a portion of the magnet protrudes from the frontal surface of the front portion of the end hook.

In another embodiment, the front portion of the end hook further comprises a second cavity and a second magnet glued to the cavity. In yet another embodiment, the second cavity forms a second protrusion on the rear surface of the front end of the end hook, the side arms is offset and generally parallel to the first and second protrusions. In yet another embodiment, the end hook comprises a top portion forming a crown.

In another further embodiment, the present invention relates to an end hook for a tape measuring device comprising: an end hook element comprising opposing front vertical portion and a rear horizontal portion, the rear horizontal portion of the end hook being generally perpendicular to the front vertical portion of the end hook, the front vertical portion of the end hook having a frontal surface and at least one cavity, and the cavity forms a protrusion on a rear surface of the front vertical portion of the end hook, the front vertical portion of the end hook comprising at least two opposing side arms, and the side arms are offset backwards so that the side arms are generally parallel to the protrusion on the rear surface of the front vertical portion of the end hook to thereby allow for accurate measurements; and at least one magnet situated within the cavity of the end hook.

In another embodiment, the end hook further comprises a crown connected to a portion of the end hook. In yet another embodiment, the crown comprises a top portion, and the top portion of the crown has a jagged edge. In still another embodiment, the crown comprises a top portion, and the top portion has a pattern. For purposes of this invention, the jagged edge or patterns on the top portions of crown functions to grasp onto the object being measured or may leave a mark to allow for measurements (such as on a carpet, etc.). The pattern on the top of the crown may be any pattern, design, or shape (jagged, scalloped, etc.).

In still yet another embodiment, the end hook comprises a bottom portion, said bottom portion of the end hook has a jagged edge. In another further embodiment, the end hook comprises a bottom portion, and the bottom portion of the end hook has a pattern. For purposes of this invention, the jagged edge or patterns on the bottom portions of end hook functions to grasp onto the object being measured or may leave a mark to allow for measurements (such as on a carpet, etc.). The pattern on the bottom of the end hook may also be any pattern, design, or shape (jagged, scalloped, etc.).

BRIEF DESCRIPTION OF THE DRAWINGS

The accompanying drawings are included to provide a further understanding of the present invention. These drawings are incorporated in and constitute a part of this specification, illustrate one or more embodiments of the present invention and together with the description, serve to explain the principles of the present invention.

FIG. 17 is an overhead view of the tape blade and end hook with the movable crown in a first position;

FIG. 18 is an overhead view of FIG. 17 with the movable crown in the second position;

FIG. 19 is a close-up view of FIG. 17:

FIG. 20 is a close-up view of FIG. 18;

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Figure 1:
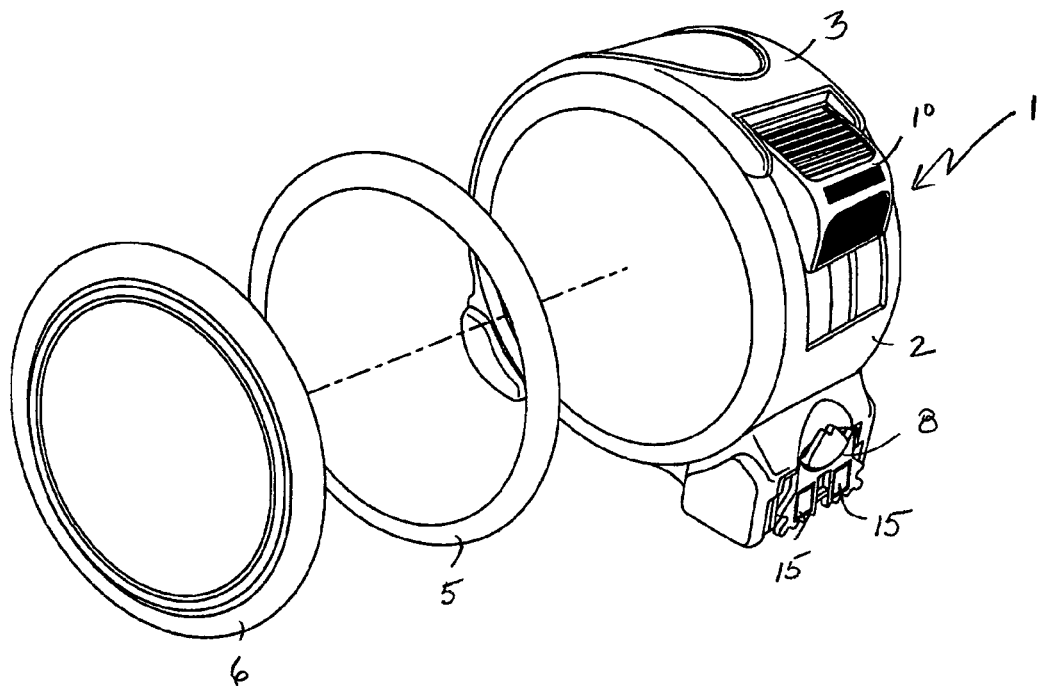
FIG. 1 is an exploded perspective view of the tape measuring device of the present invention with the strategically placed magnets on the side wall of the housing.
Figure 2:
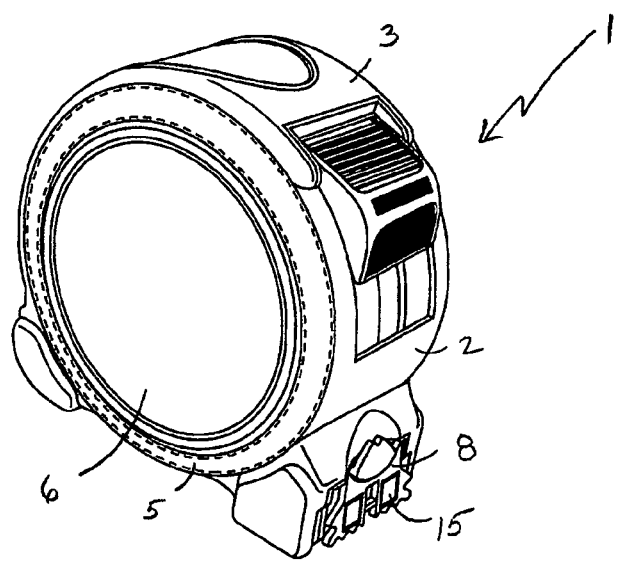
FIG. 2 is perspective view of the assembled tape measuring device of FIG. 1.
Figure 3:
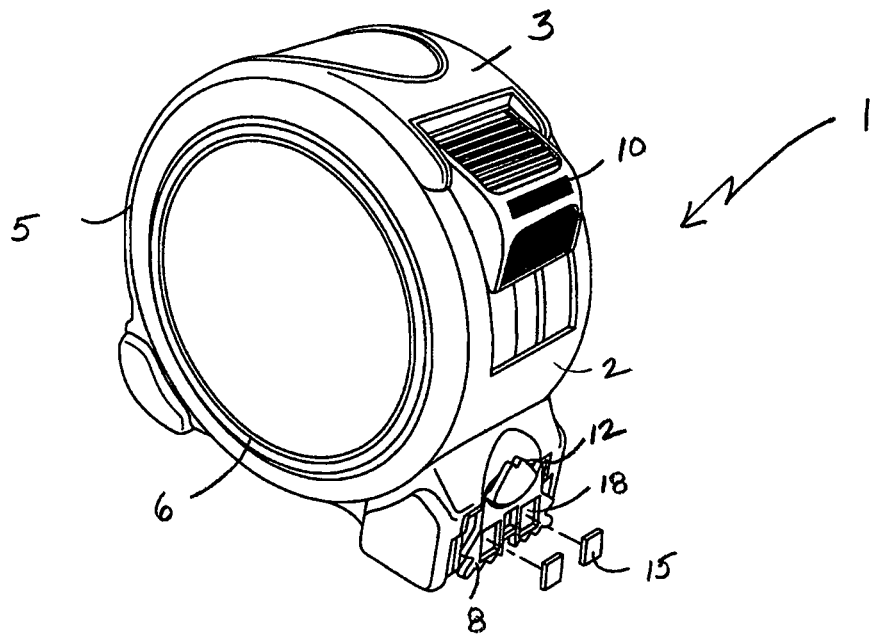
FIG. 3 is an exploded perspective view of the tape measuring device and the end hook with the magnets.
Figure 4A:
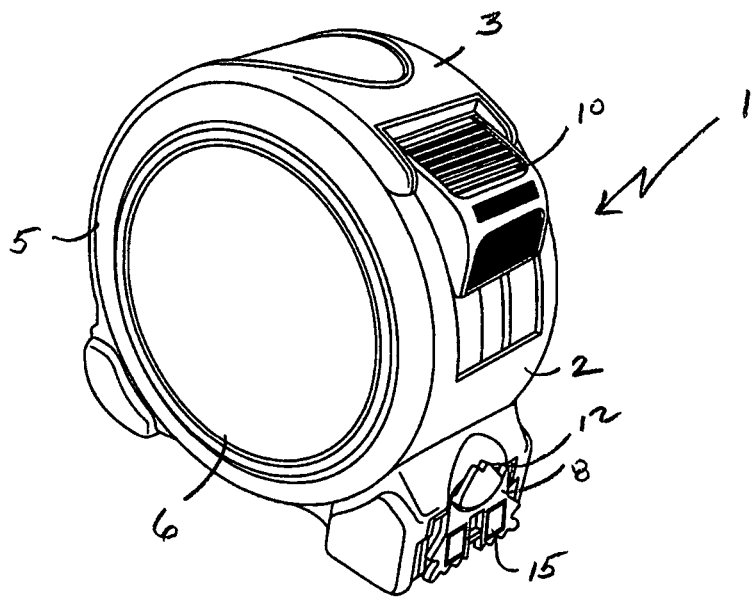
FIG. 4a-d are various views of the device of FIG. 3 assembled and detailing the end hook with magnets.
Figure 4B:
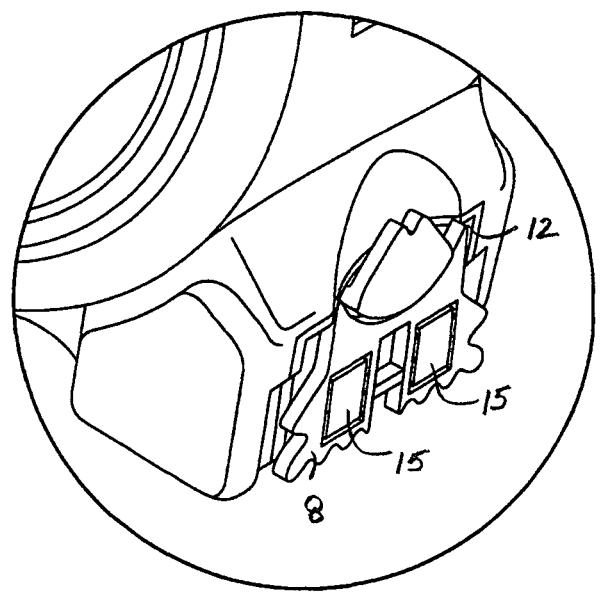
Figure 4C:
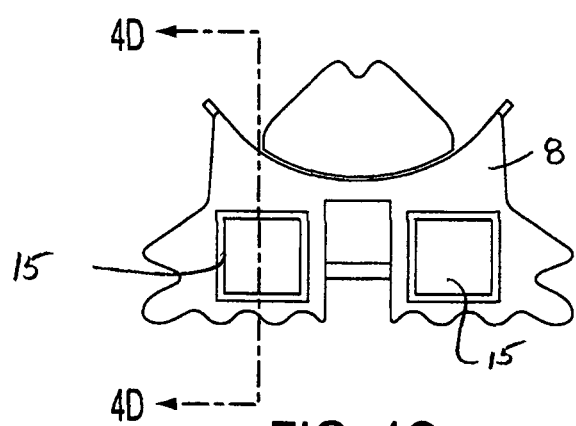
Figure 4D:
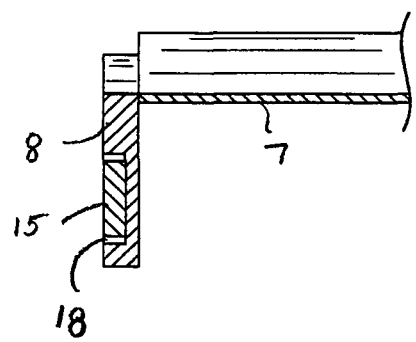

FIGS. 1-2 depicts one embodiment of the present invention showing a tape measuring device 1 comprising a housing 2 with a top portion 3, a bottom portion 4 and side walls 9. The ring shaped magnet 5 is attached to one of the side walls 4 of housing 2 and there is a cover plate 6 which covers at least a portion of the magnet 5 and at least a portion of the side wall 4 of the housing 2. There is a tape blade 7 with one end attached to an end hook 8 and there are end hook magnets 15. There is a slidable member 10 for stopping and releasing the tape blade 7.

FIGS. 3, 4A, 4B, 4C and 4D relate to another embodiment of the invention showing the tape measuring device with the end hook magnets 15 attached to cavities 18 on the front surface of the end hook 8. The end hook 8 is attached to one end of the tape blade 7 which protrudes from the opening 12. The tape blade 7 is extendable and retractable and scrollably received within the hollow interior cavity of the housing 2 of the device 1.

Figure 5:
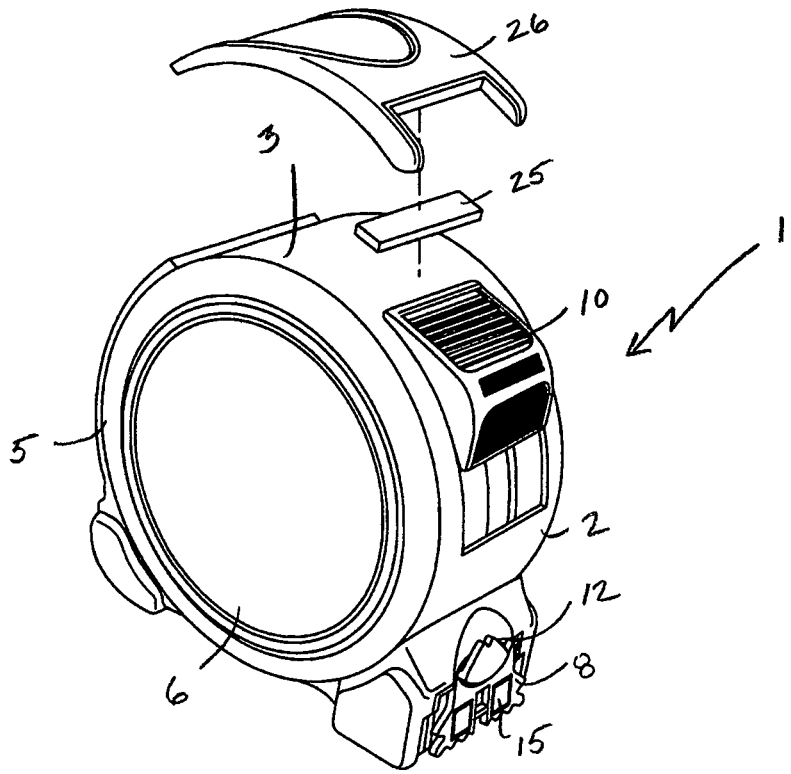
FIG. 5 is an exploded perspective view of the tape measuring device with a magnet and top portion cover situated upon the top portion of the housing.
Figure 6:
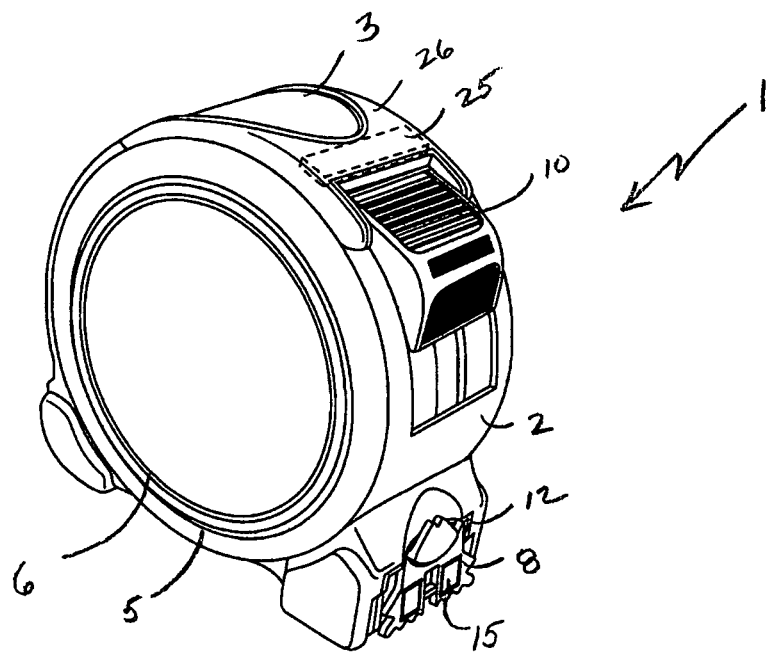
FIG. 6 is a perspective view of FIG. 5 assembled.
Figure 7:
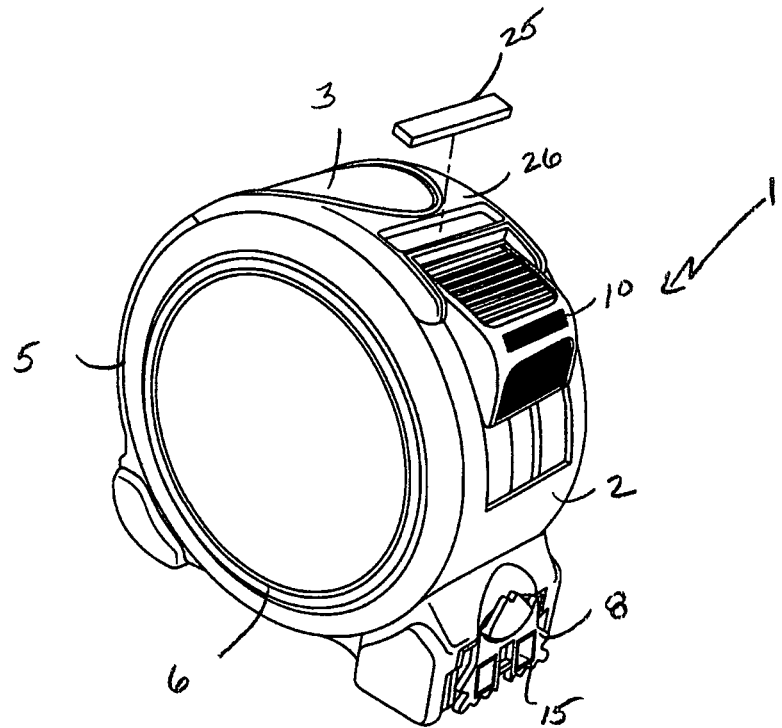
FIG. 7 is an exploded view of another embodiment of the present invention with a magnet on the top portion of the housing.
Figure 8:
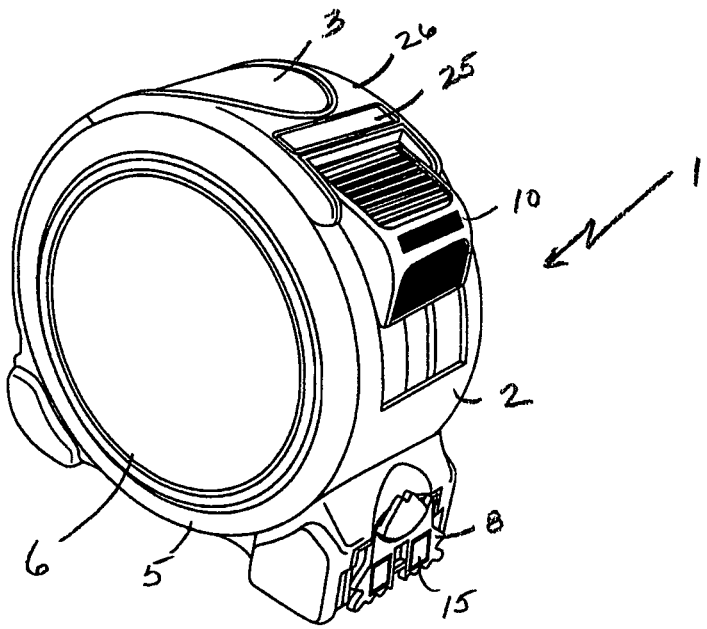
FIG. 8 is a perspective view of FIG. 7 assembled.

FIGS. 5-8 show another embodiment of the present invention showing the tape measuring device 1 with a top portion magnet 25 attached to the top portion 3 of the housing 2 and a top portion cover 26. In one embodiment, the top portion cover 26 covers a portion of the top portion magnet 25 and at least a portion of the top portion 3 of the housing 2 (FIG. 5-6). In another embodiment, the top portion cover forms a space 20 where the top portion magnet 25 is inserted (FIG. 7-8).

Figure 9:
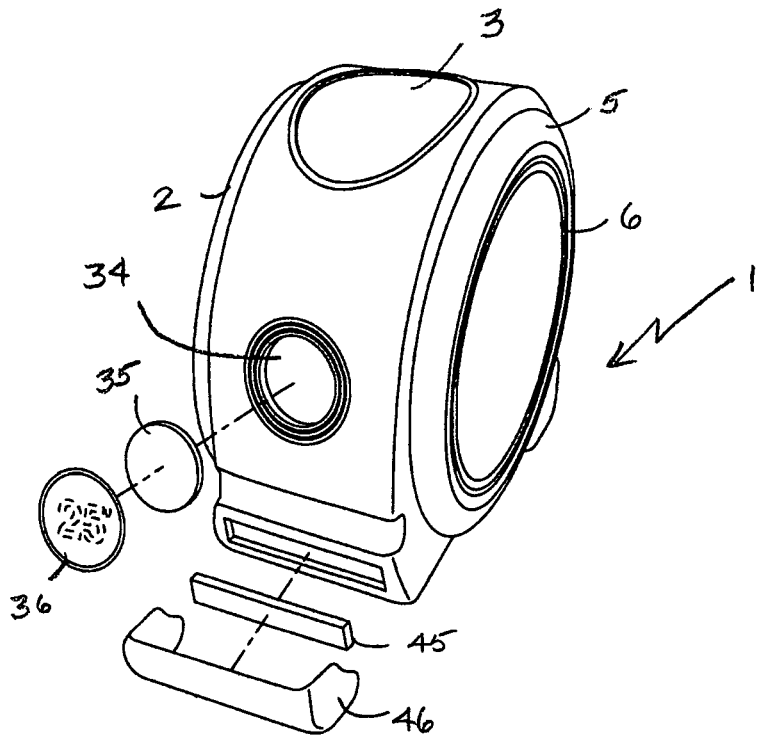
FIG. 9 is an exploded perspective view of still another embodiment of the device of the present invention.
Figure 10:
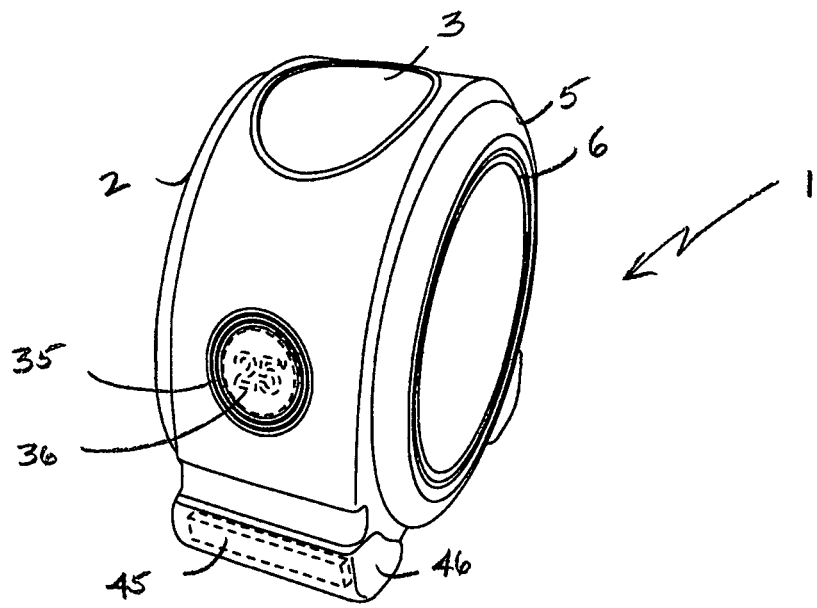
FIG. 10 is a perspective view of FIG. 9 assembled.
Figure 11:
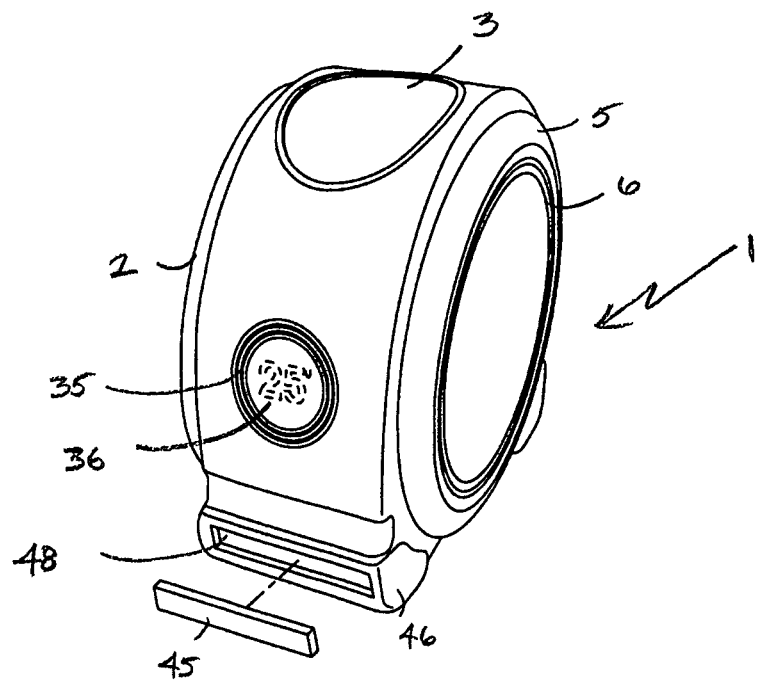
FIG. 11 is an exploded perspective view of yet another embodiment of the device of the present invention.
Figure 12:
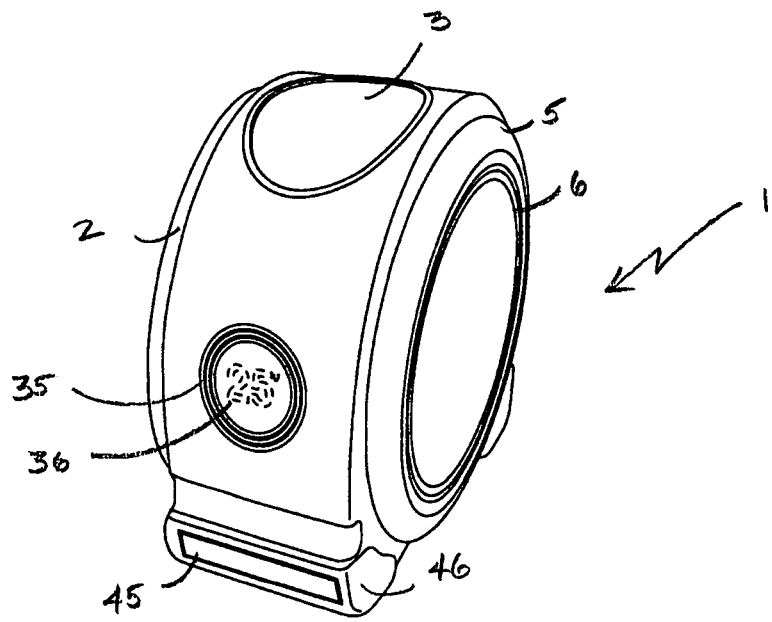
FIG. 12 is a perspective view of FIG. 11 assembled.

FIGS. 9-12 illustrate a further embodiment of the prevent invention showing a magnets 35 and 45 attached to a backside 11 of the housing 2. Magnet 35 is generally round and fits in an indentation 34 and has a cover 36 (FIG. 9-10). Cover 36 covers at least a portion of the magnet 35. Magnet 45 is situated on the backside 11 of the housing adjacent to the bottom portion 4 of the housing 2 (FIG. 11-12). In one embodiment, there is a second cover 46 which covers at least a portion of the magnet 45. In another embodiment, the second cover 46 forms a space 48 which allows for the insertion of the magnet 45.

Figure 13:
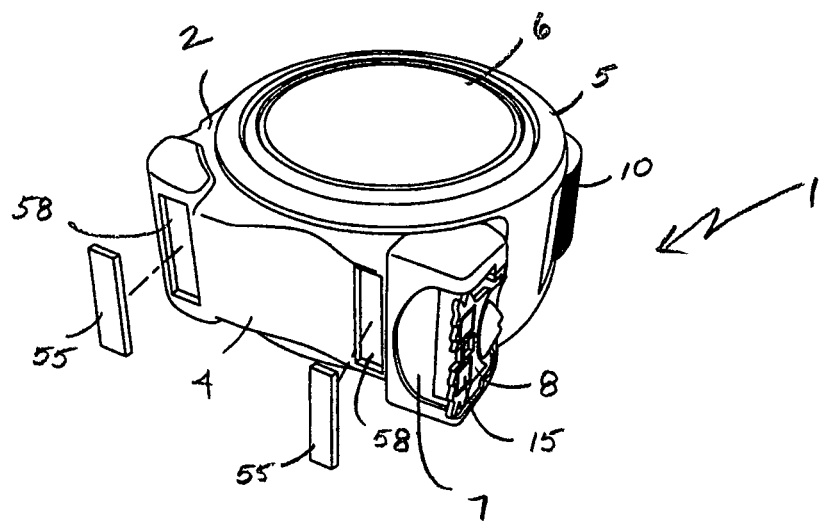
FIG. 13 is an exploded perspective view of the magnets attached to the bottom portion of the housing.
Figure 14:
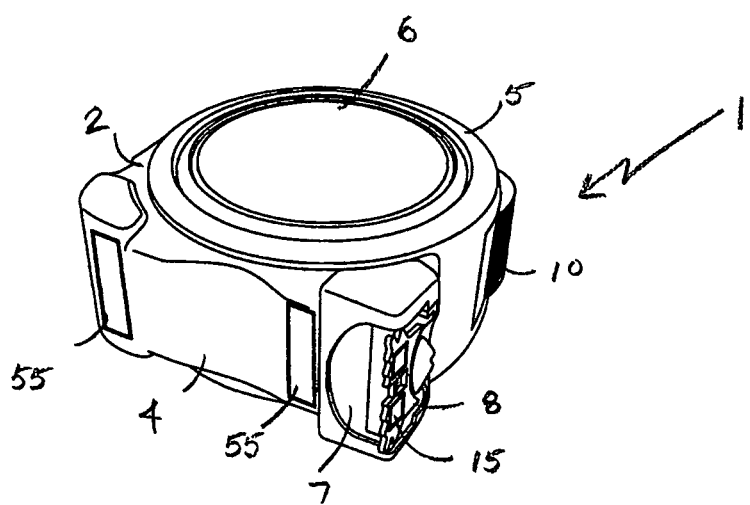
FIG. 14 is a perspective view of FIG. 13 with the magnets attached to the feet of the housing.

FIG. 13-14 provide for another further embodiment of the invention whereby the bottom portion 4 of the housing 2 comprises at least one foot 13 and the foot 13 comprises a space 58 for inserting a magnet 55. In one embodiment, there are two magnets, 55a and b respectively, and two feet, 13a and b respectively.

Figure 15:
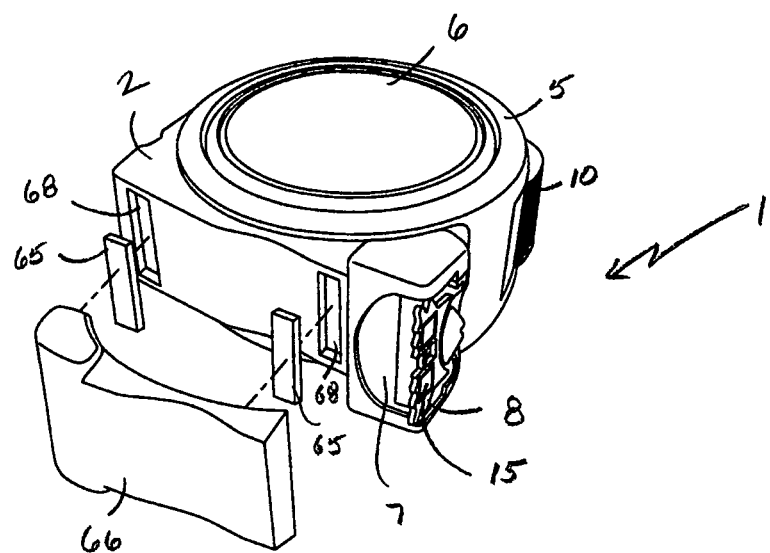
FIG. 15 is an exploded perspective view of the magnets with the bottom portion cover.
Figure 16:
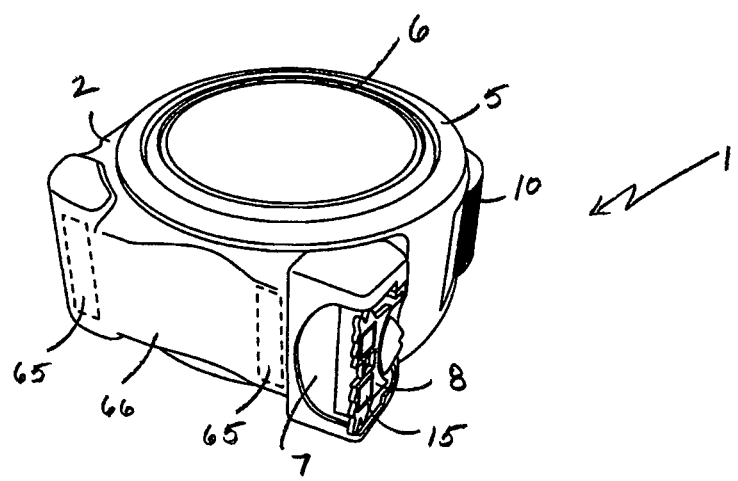
FIG. 16 is a perspective view of FIG. 15 assembled.
Figure 21:
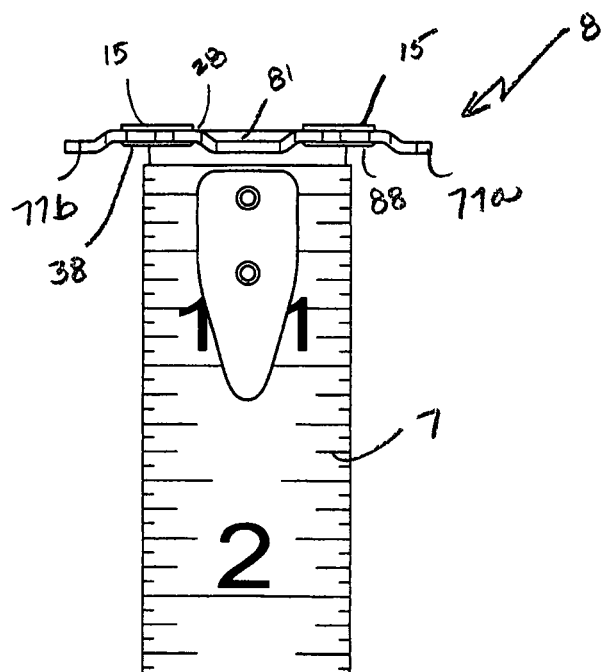
FIG. 21 is the underneath view of the tape blade, end hook and crown.
Figure 22:
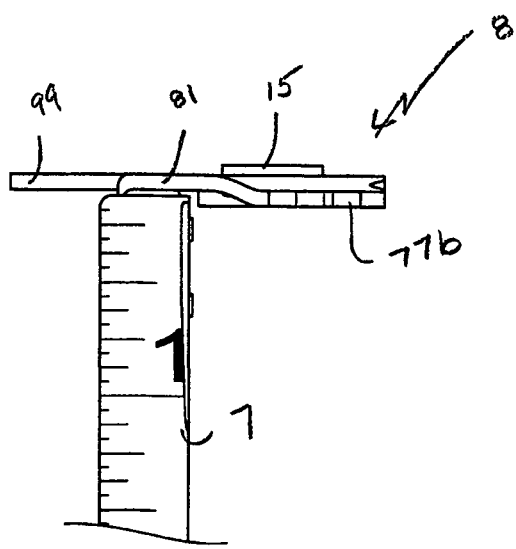
FIG. 22 is a side view of FIG. 17.
Figure 23:
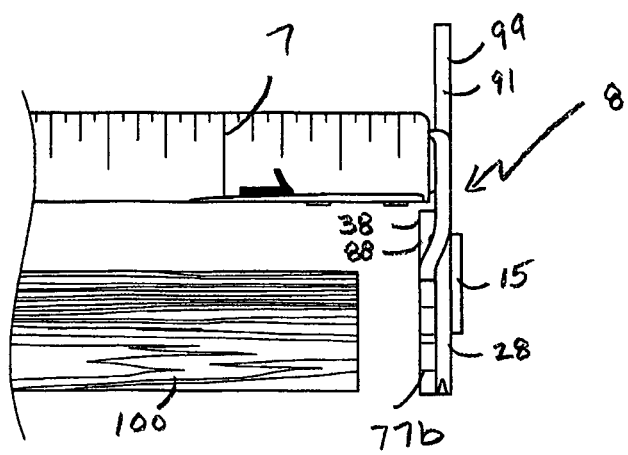
FIG. 23 is a side view of FIG. 22 with the object being measured.
Figure 24:
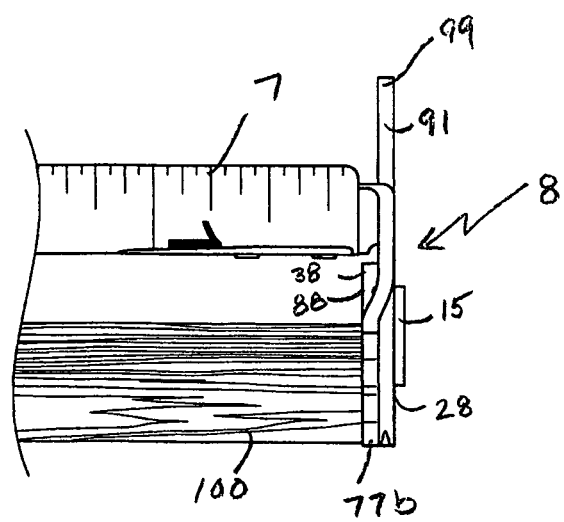
FIG. 24 is the side view of FIG. 23 with the object being measured contacting the back of the end hook with magnets.

FIG. 15-16 depict still yet another embodiment whereby the bottom portion 4 of the housing 2 comprises at least one space 68 for inserting a magnet 65. There is a cover 66, which is situated over the bottom portion 4 of the housing 2 and covers at least a portion of the magnet 65.

Referring now to FIGS. 17-26, the end hook 8 of the present invention comprises opposing front and rear portions, 81 and 82 respectively. At least one end of said tape blade 7 is attached to said rear portion 82 of the end hook 8. The rear portion 82 of the end hook 8 is generally perpendicular to the front portion 81 of the end hook 8. The front portion 81 of the end hook 8 has a frontal surface 28 and at least one cavity 18. The cavity 18 forms a protrusion 88 on a rear surface 38 of the front portion 81 of the end hook 8. The magnet 15 fit within the cavity 18 of the end hook 8.

In one embodiment, the front portion 81 of the end hook 8 comprises two side arms, 77a and 77b respectively. In another embodiment, the side arms, 77a and 77b, of the front portion 81 of the end hook 8 is offset (see FIGS. 19-20) and is generally parallel to the protrusion 88 of the cavity 18 on the rear surface 38 of the front portion 81 of the end hook 8 to thereby allow for accurate measurements when the rear surface 38 of the front portion 81 contacts an object 100 to be measured.

In a further embodiment, the side arms, 77a and 77b, of the front portion 81 is set backward of the front portion 81 of the end hook 8 to a distance that is parallel to the protrusion 88 of the cavity 18 to thereby allow for accurate measurements.

In another embodiment, at least a portion of the magnet 15 is glued to the cavity 18 of the front portion 81 of the end hook 8.

In still another embodiment, the end hook 8 comprises a top portion 84 forming a crown 99. In yet another embodiment, the crown 99 connected to a portion of the end hook 8.

Figure 25:
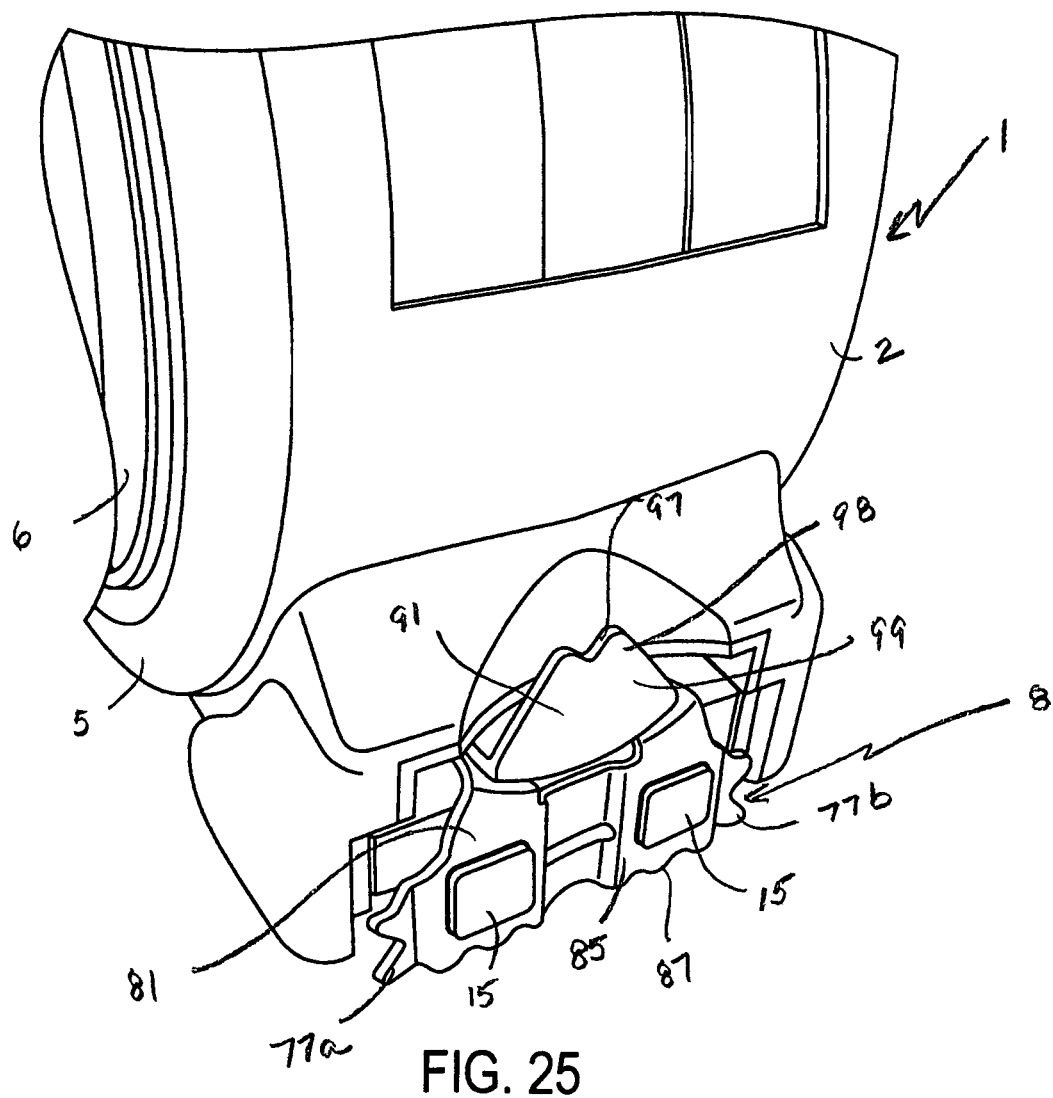
FIG. 25 is a close-up of the tae measure with the magnetic end hook.
Figure 26:
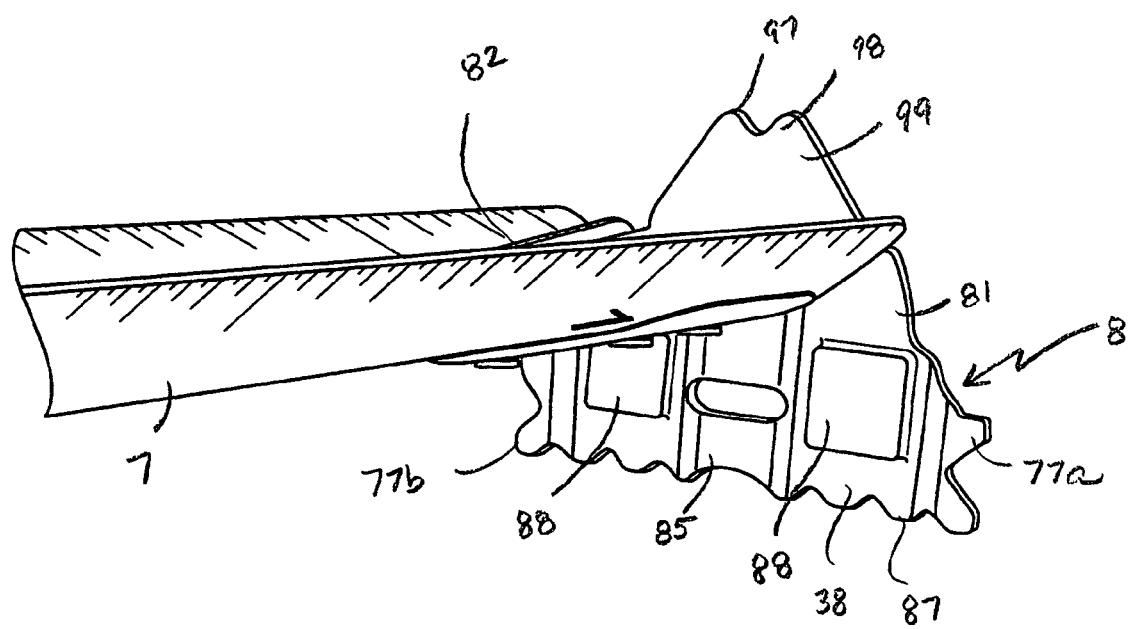
FIG. 26 is a side perspective view of the tape blade and end hook of the present invention.

Referring now to FIGS. 25-26, the crown 99 comprises a frontal element 91, and the frontal element 91 of the crown 99 is generally perpendicular to the rear portion 82 of the end hook 8 and is generally parallel to the front portion 81 of the end hook 8. The crown 99 comprises a top portion 98, and the top portion 98 has a jagged edge 97. The end hook 8 comprises a bottom portion 85, and the bottom portion 85 of the end hook 8 having a jagged edge 87.

In one embodiment, the cover plates and covers used in the present invention maybe constructed of a material that allows for functionality of the magnets and does not obstruct the magnetism of the magnets.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A tape measuring device comprising:
   a housing comprising a hollow interior cavity and an opening, said opening leading to said hollow interior cavity;
   an extendable and retractable tape blade having opposing ends, said tape blade being scrollably received within said hollow interior cavity of said housing, at least one end of said tape blade being designed to protrude from said opening of said housing;
   an end hook having horizontal and vertical elements, at least one end of said tape blade being attached to a portion of said horizontal element of said end hook, said horizontal element of said end hook being generally perpendicular to said vertical element of said end hook, said vertical element comprising front and rear surfaces, said rear surface of said vertical element comprising a protrusion, said protrusion being formed by at least one rear wall and at least one side wall, said front surface of said vertical element of said end hook having a cavity formed by said protrusion and designed for receiving a magnet; and
   a first magnet designed to fit within said cavity and against a portion of said rear wall of said protrusion on said vertical element of said end hook, at least a portion of said first magnet protrudes beyond said front surface of said vertical element.

2. The device of claim 1 wherein said vertical element of said end hook comprising at least one side arm.

3. The device of claim 2 wherein said side arm of said vertical element of said end hook is offset and is generally parallel to said protrusion on said rear surface of said vertical element of said end hook to thereby allow for accurate measurements when said rear surface of said vertical element contacts an object to be measured.

4. The device of claim 3 wherein said first and second side arms are offset backward to thereby allow for accurate measurements.

5. The device of claim 2 wherein said side arm of vertical element is set backward of said vertical element of said end hook to thereby allow for accurate measurements.

6. The device of claim 1 wherein said rear surface of said vertical element of said end hook further comprises a second protrusion, said second protrusion forming a second cavity on said front surface of said vertical element of said end hook.

7. The device of claim 6 further comprising a second magnet, said second magnet is designed to fit within said second cavity on said front surface of said vertical element of said end hook.

8. The device of claim 7 wherein said vertical element of said end hook comprises a second side arm situated opposing said first side arm.

9. The device of claim 7 wherein at least a portion of said first and second magnets are adhered to said vertical element of said end hook using adhesives, glues, laminates, thermoplastics, elastomers, thermosets, epoxies, curing adhesives and mixtures thereof.

10. The device of claim 7 wherein at least a portion of said first and second magnets protrude from said frontal surface of said vertical element of said end hook.

11. The device of claim 1 further comprising a crown attached to said end hook.

12. The device of claim 11 wherein said crown is attached to a portion of said horizontal element of said end hook.

13. The device of claim 12 wherein said crown is movable relative to said horizontal element of said end hook.

14. The device of claim 11 wherein said crown comprises a frontal element, said frontal element of said crown being generally perpendicular to said horizontal element of said end hook and being generally parallel to said vertical element of said end hook.

15. The device of claim 11 wherein said crown comprises a top portion, said top portion having a pattern.

16. The device of claim 15 wherein said top portion of said crown comprises a jagged edge.

17. The device of claim 1 wherein said magnet is glued to said rear wall of said protrusion of said vertical element of said end hook, said magnet is only exposed on said front surface of said vertical element of said endhook.

18. An end hook for a tape measuring device comprising:
    an end hook element comprising vertical and horizontal elements, said horizontal element of said end hook being generally perpendicular to said vertical element of said end hook, said vertical element comprising front and rear surfaces, said rear surface of said vertical element comprising a protrusion, said protrusion being formed by at least one rear wall and at least one side wall, said front surface of said vertical element of said end hook having a cavity designed for receiving a magnet; and
    at least one magnet situated within said cavity and against a portion of said rear wall of said protrusion on said vertical element of said endhook, at least a portion of said magnet protrudes.

19. The end hook of claim 18 further comprising a movable crown connected to a portion of said end hook.

20. A tape measuring device comprising:
    a housing comprising a hollow interior cavity and an opening, said opening leading to said hollow interior cavity;
    an extendable and retractable tape blade having opposing ends, said tape blade being scrollably received within said hollow interior cavity of said housing, at least one end of said tape blade being designed to protrude from said opening of said housing;
    an end hook having horizontal and vertical elements, at least one end of said tape blade being attached to a portion of said horizontal element of said end hook, said horizontal element of said end hook being generally perpendicular to said vertical element of said end hook, said vertical element comprising front and rear surfaces, said rear surface of said vertical element comprising a protrusion, said protrusion being formed by at least one rear wall and at least one side wall, said front surface of said vertical element of said end hook having a cavity formed by said protrusion and designed for receiving a magnet;
    a first magnet designed to fit within said cavity and at least a portion of said first magnet protrudes beyond said front surface of said vertical element; and
    a movable crown attached to a portion of the end hook.

* * * * *